(12) United States Patent
Chesavage

(10) Patent No.: US 6,366,380 B1
(45) Date of Patent: Apr. 2, 2002

(54) OPTICAL TRANSCEIVER EMI DETUNING DEVICE

(75) Inventor: Jay A. Chesavage, Palo Alto, CA (US)

(73) Assignee: Cisco Technology, Inc, San Jose, CA (US)

( * ) Notice: Subject to any disclaimer, the term of this patent is extended or adjusted under 35 U.S.C. 154(b) by 0 days.

(21) Appl. No.: 09/249,685

(22) Filed: Feb. 12, 1999

(51) Int. Cl.[7] ............................................. H04B 10/00
(52) U.S. Cl. ...................... 359/152; 359/180; 359/189; 385/88; 385/92
(58) Field of Search ................. 359/152, 163, 359/180, 189; 385/88, 92

(56) References Cited

U.S. PATENT DOCUMENTS

| | | |
|---|---|---|
| 4,217,031 A | 8/1980 | Mignien et al. |
| 4,384,165 A | 5/1983 | Loving et al. |
| 4,724,315 A | 2/1988 | Goerne |
| 4,890,199 A | 12/1989 | Beutler |
| 4,979,787 A | 12/1990 | Lichtenberger |
| 5,011,246 A | 4/1991 | Corradette et al. |
| 5,053,924 A | 10/1991 | Kurgan |
| 5,067,232 A | 11/1991 | Seidel et al. |
| 5,082,338 A | 1/1992 | Hodge |
| 5,113,466 A | 5/1992 | Acarlar et al. |
| 5,155,786 A | 10/1992 | Ecker et al. |
| 5,309,542 A * | 5/1994 | Strope et al. ................ 385/140 |
| 5,335,147 A | 8/1994 | Weber |
| 5,337,396 A | 8/1994 | Chen et al. |
| 5,371,819 A | 12/1994 | Szegda |
| 5,448,676 A | 9/1995 | White et al. |
| 5,511,798 A | 4/1996 | Kawamoto |
| 5,606,182 A | 2/1997 | Yoshida et al. |
| 5,841,562 A * | 11/1998 | Rangwala et al. ........... 359/152 |
| 6,040,934 A * | 3/2000 | Ogusu et al. ................ 359/152 |
| 6,061,493 A * | 5/2000 | Gilliland et al. .............. 385/92 |

* cited by examiner

Primary Examiner—Kinfe-Michael Negash
(74) Attorney, Agent, or Firm—Jay A. Chesavage

(57) ABSTRACT

A transceiver for the transmission and reception of high speed optical signals contains a detuning structure which reduces the gain for quarter wave radiation of Electro Magnetic Radiation (EMI). A conductive housing couples light energy from a source or a detector to an external fiber having a metallic ferrule. The conductive housing also is referenced to the chassis enclosure of the transceiver thereby attenuating the quarter wave radiator.

18 Claims, 5 Drawing Sheets

Section A-A

Section B-B

Section A-A
Prior Art

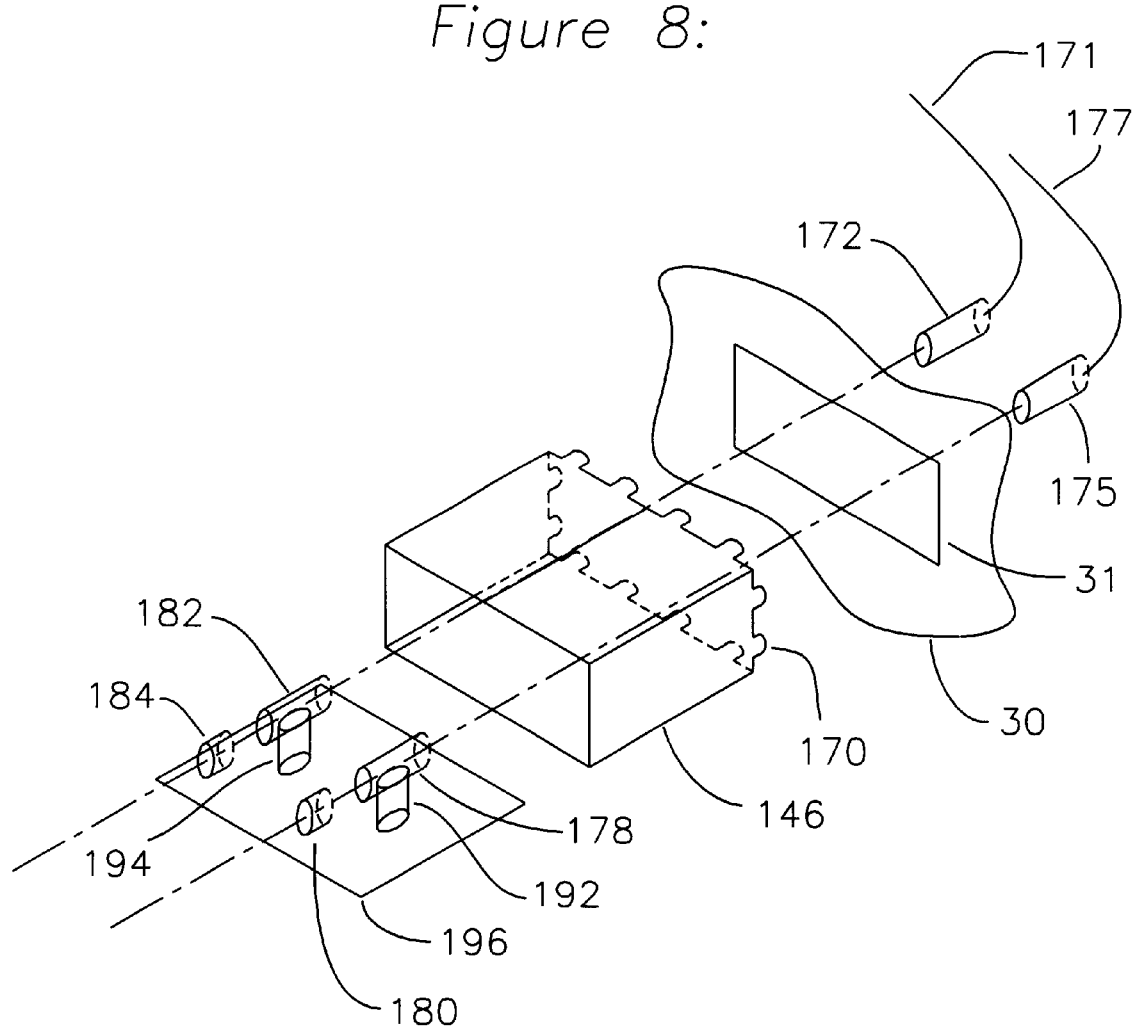

OPTICAL TRANSCEIVER EMI DETUNING DEVICE

FIELD OF THE INVENTION

The current invention is directed to a device which reduces the electromagnetic interference produced by an optical transceiver used in optical data links between data processing equipment.

BACKGROUND OF THE INVENTION

Optical transceivers are commonly used in communications equipment. A transceiver comprises an optical transmitter and an optical receiver, both housed in a common enclosure. The transmitter converts an electrical input into a temporally modulated optical signal coupled to an optical fiber. The receiver accepts an optical signal having a modulation function, and converts it to an electrical voltage. Some versions of this receiver also recover a clock to in addition to the recovered data. The transmitter and receiver generally operate at the same data rate. In the prior art, typical data rates are 155 Mbps (million bits per second) for oc-3 rates, 622 Mbps for oc-12 rates, and 2400 MBps for oc-48 rates. U.S. Pat. No. 4,979,787 by Lictenberger discloses an optical interface for receiving from and transmitting to an optical fiber. U.S. Pat. No. 5,113,466 by Acarlar et al, U.S. Pat. No. 5,011,246 by Corradetti et al, disclose optical transceivers, but do not speak to the problem of preventing EMI emissions. U.S. Pat. No. 5,337,396 describes a conductive plastic housing for a transmitter or a receiver which provides electrical contact to the printed circuit board ground pins, but does not address the problem of making a shielding contact to an enclosure, or reducing EMI coupling to the optical cables.

OBJECTS OF THE INVENTION

A first object of the invention is to reduce the EMI (Electro-Magnetic Interference) emissions of a transmitter by providing a grounded reference for unbalanced transmitter currents. A second object of the invention is to reduce the EMI emissions of a receiver by minimizing unbalanced clock currents flowing in the recovered clock output pins. A third object of the invention is to reduce the EMI emissions of a receiver by detuning the structure housing the receiver. A fourth object of the invention is to provide a chassis reference to an internal receive ferrule and an internal transmit ferrule through a first extension shield which is connected electrically to a collar shield, which is in contact with the chassis reference.

SUMMARY OF THE INVENTION

A prior art oc-12 transceiver conducts differential and common mode currents at a fundamental rate of 622 Mhz, and a prior art oc-48 transceiver conducts these currents at a fundamental rate of 2400 Mhz. A prior art transceiver has a physical length roughly equal to that of a quarter wave antenna for approximately 3 Ghz electromagnetic waves. A fundamental rate 622 Mhz square wave signal from an oc-12 data link has a 5th harmonic in this same 3 Ghz range. Hence, the 5th harmonic of a 622 Mhz transmit or receive electrical signal will excite a quarter wave antenna response in the 3 Ghz range from the prior art transceiver, affording gain and a nearby aperture for radiation of this signal. The present invention provides for the reduction of EMI by using pre-existing internal optical elements as shield elements, and by detuning the quarter wave antenna property of the transceiver.

BRIEF DESCRIPTION OF THE INVENTION

FIG. 8 is an isometric view of an alternate detuning device.

DETAILED DESCRIPTION OF THE INVENTION

Figure 1:
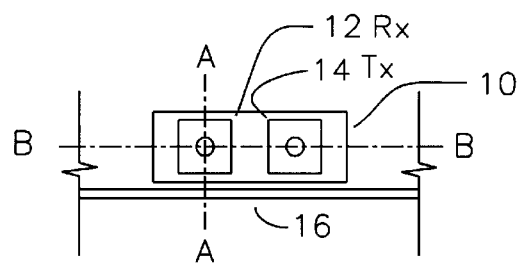
FIG. 1 is a front view of a prior art transceiver mounted on a printed circuit board.

FIG. 1 shows the front view of a prior art transceiver 10 mounted to a printed circuit board 16. Transceiver apertures 12 and 14 accept optical connectors for the respective reception and transmission of light. For reference, sections A—A and B—B enable the understanding of internal structures found in the transceiver, front panel sheet metal chassis, and cable assembly elements.

Figure 2:
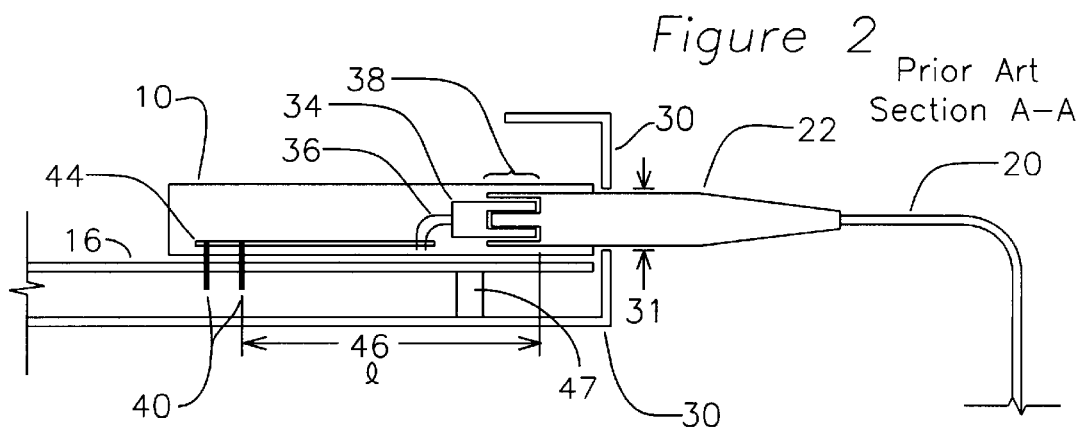
FIG. 2 is a section view of the transceiver of FIG. 1 including a fiber-optic cable assembly.

FIG. 2 shows the section A—A view of FIG. 1. Transceiver 10 is mounted on circuit board 16, which is secured to a chassis 30 using grounded standoff spacer 47. Chassis 30 provides mechanical support and EMI shielding for the electrical signals of circuit board 16. Chassis 30 also has an aperture 31 in front of each transceiver 10 to allow cables 22 to plug into the transceiver 10. Each cable assembly comprises an optical cable 20 molded into an optical termination 22 which has a strain relief part, an optical access part, and a locking part, as will be described later. Associated with the transceiver 10 are an electrical to optical (E/O) converter, or optical to electrical (O/E) converter device 34, which is in close proximity to the optical fiber of cable terminator 22. This alignment of the optical fiber to the E/O or O/E converter is achieved in area 38. O/E or E/O converter electrical signals are disposed via converter leads 36 to printed wires on the internal circuit board 44, and after further processing, are delivered to the system circuit board via interface pins 40. Since the interface pins 40 are typically the only electrical reference to ground, the electrically unconstrained dimension l 46 is capable of radiating as an antenna if unbalanced currents appear on terminals 40. As will be described later, these unbalanced currents are intrinsically present in differential circuits driven by asymmetrical drivers.

Figure 3:
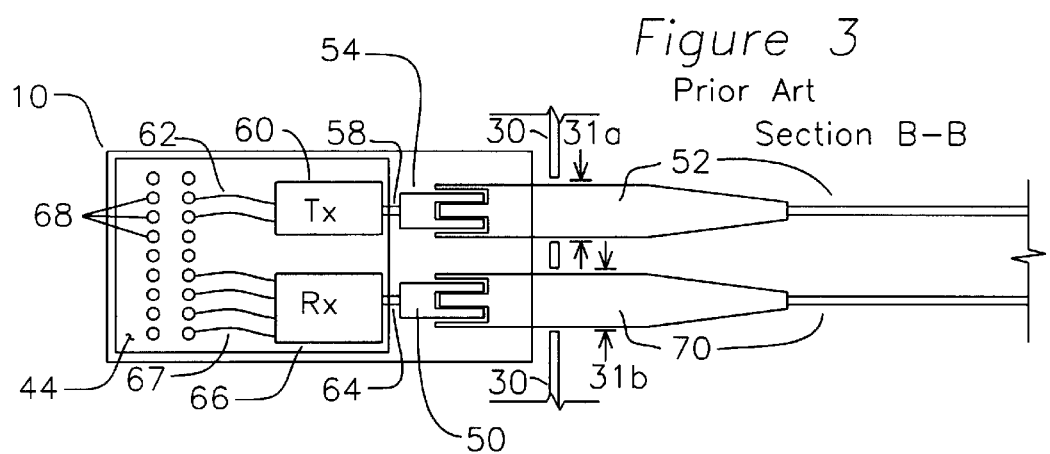
FIG. 3 is a section view of the transceiver of FIG. 1 including a fiber-optic cable assembly.

FIG. 3 shows section B—B of the transceiver of FIG. 1. Transceiver 10 has a transmitter driver 60, and receiver electronics 66. Transmit optical cable 52 passes through aperture 31a in chassis 30, and is optically coupled to the electrical to optical converter 54. High speed electrical signals are carried via E/O converter leads 58 from the transmitter driver electronics 60, which typically comprises a high speed power amplifier driven by a differential input signal 62. The conductor signals 62 are formed on circuit board 44, and transmit driver 60 typically comprises integrated circuits and other electronic components mounted on the circuit board 44. Typical transmit driver integrated circuits 60 include part number VSC7923 by Vitesse Semiconductor Corporation of Camarillo, Calif. Receive cable 70 passes through an aperture 31b in chassis 30 to optical to electrical converter 50, and wires 64 carry high speed signals to receive electronics 66, which comprise a limiting amplifier and an optional clock extraction circuit. The receive electronics 66 produce two pairs of differential signals 67 provided as printed wiring on circuit board 44, comprising recovered data and recovered clock, which are delivered to connector pins 68, as will be described later. Typical oc-12 receiver integrated circuits include VSC7911 for a limiting amplifier, available from Vitesse Semiconductor, and S3027 clock recovery circuit available from Advanced Micro Circuit Corporation of San Diego, Calif.

Figure 4:
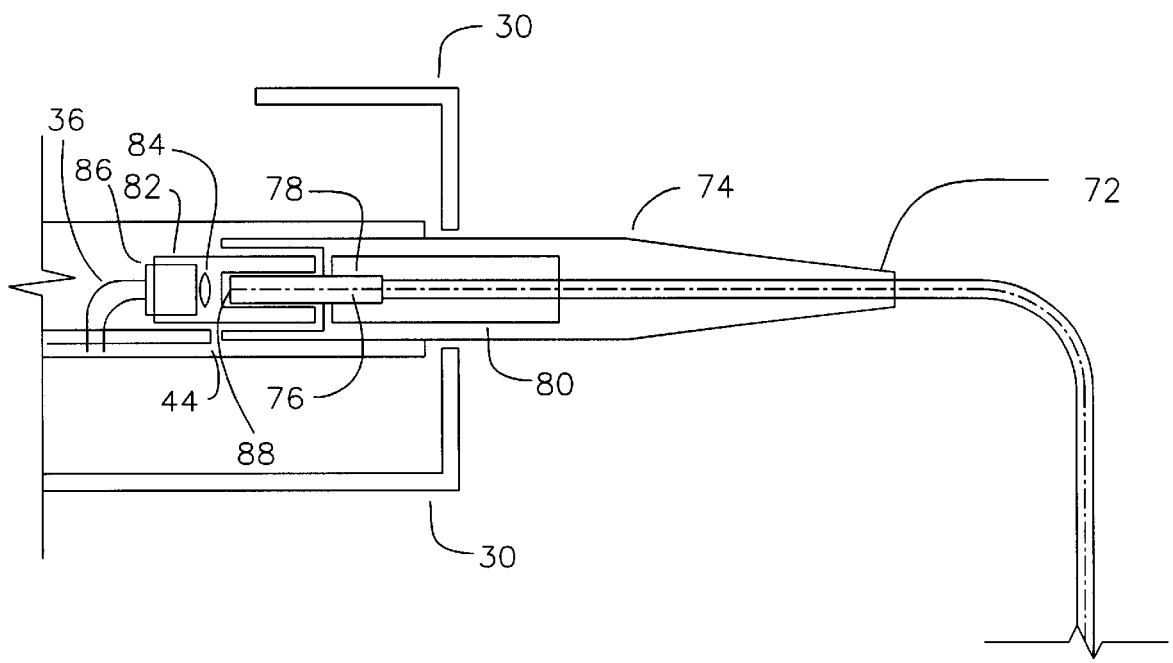
FIG. 4 is a detailed section view of the transceiver of FIG. 1.

FIG. 4 shows the detail of the relationship between the fiber and electrical/optical converter. Optical cable 72 having a continuous fiber 76 is attached to a strain relief housing 74 through cylindrical crimp ferrule 80 and terminating ferrule 78. Fiber 76 proceeds through each of these elements 80 and 78 uninterrupted until the far side 88 of terminating ferrule 78. The terminating ferrule 78 is typically a precision ground zirconium cylinder having an axial aperture for the optical fiber 76, and this ferrule 78 has very tight and reliable tolerances, thereby affording a precision fit with either the transmit or receive receptacle housing 82, and achieving precision optical alignment with lens 84 and electrical/optical converter 86, which is either a laser diode or Light Emitting Diode (LED) for the case of element 86 being an E/O converter in a transmitter, or a photodetector diode for the case of element 86 being an O/E converter in a receiver. Converter leads 36 provide an electrical connection to internal circuit board 44, as was described earlier. In practice, reliable fiber links require an integral and repeatable mechanical alignment between removable fiber 76 and fixed housing 82, which is accomplished by polishing the fiber end 88, and ensuring a precise mechanical relationship between precision ferrule 78 and crimp ferrule 80. This is often accomplished in cable terminations by using a brass crimp piece 80. In this manner, light delivered in the optical fiber is maximally coupled between the fiber 76 and the electrical/optical converter 86 by controlling the fiber position at face 88. While the overall arrangement of elements of FIG. 4 ensures the reliable electrical and optical operation of the transceiver, the electromagnetic interference minimizing properties are compromised, particularly at higher frequencies. The precision receptacle 82 is typically machined from metal, and when mated with the cable precision ferrule 78, is in close proximity with brass crimp ferrule 80. Furthermore, roughly half of crimp ferrule 80 extends beyond the chassis 30, and the functional purpose of chassis 30 is the containment of EMI. When a cable is plugged into a port, this containment is breached, as any EMI present in the enclosure is conducted via the conductive ferrule 80 outside the enclosure. Since the cables typically used for the transport of optical signals are a pre-existing part of the building wiring, they generally are used as-is. Over time, as data rates on these optical cables have increased from oc-3 (155 Mbps) to oc-12 (622 Mbps) to oc-48 (2.4 Gbps), these same optical cables are carrying faster optical signals. Accordingly, the electronic technologies inside the transceivers receiving and generating these optical signals have gone to higher internal switching speeds, as measured by the well known electrical parameter rise time. For example, the rise time of CMOS (Complimentary Metal Oxide Semiconductor) oc-3 circuits is on the order of 1000 pS (Pico-seconds, or $10^{-12}$ seconds), while PECL (Positive Emitter Coupled Logic) rise times used in oc-12 circuits are reduced to 100 pS, and GaAs (Gallium Arsinide) technologies used for oc-48 have rise times on the order of 50 pS. A frequently used guideline from the book "High-Speed Digital Design" by Johnson and Graham is that the most of the frequency energy in a signal is below a knee frequency related to rise time by the expression:

$$Fknee = \frac{0.5}{Tr}$$

Where $F_{knee}$=break point in frequency spectrum

Tr=rise time of signal

By application of this formula, we can see that the knee points for the above CMOS oc-3 signal is 500 Mhz, while the PECL oc-12 signal has a knee frequency of 5000 Mhz, while the GaAs signal has a knee frequency of 10 Ghz. The bandwidth capabilities of the optical cable are sufficient for the increased signaling speeds, however the crimp ferrule 80 internal to the cable has become the source of radiation of signals, particularly as they are used in higher speed interfaces.

Figure 5:
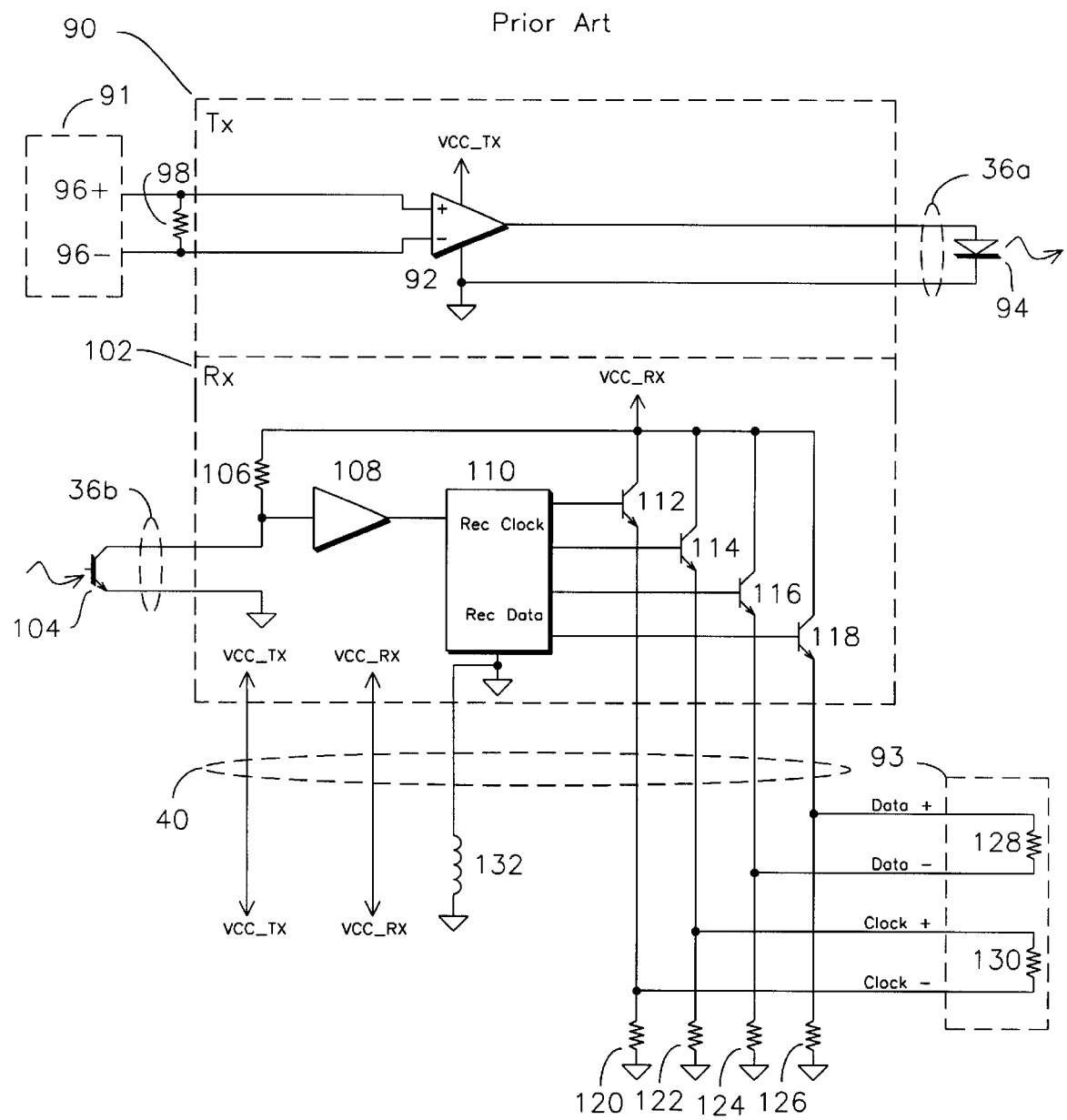
FIG. 5 is the schematic and block diagram of the individual elements of the transceiver comprising a transmitter converting an electrical signal to a modulated light source and a receiver converting a modulated light input into a data signal accompanied by a recovered clock signal.

FIG. 5 shows the electrical elements of the prior art transceiver. Transmitter 90 has differential input signals 96+ and 96− delivered from a serializer 91 to a termination resistor 98 and to power amplifier 92, which drives a modulation current through diode 94 via leads 36a. In the case of single mode lasers, diode 94 is often a Fabry-Perot laser diode, and in the case of a multi-mode optical source, it may be a Light Emitting Diode (LED). The laser diode or LED 94 is secured into a housing 82 with a lens 84 for the maximum delivery of energy to the fiber as described earlier in FIG. 4. Receiver 102 comprises photodiode 104, which converts input light energy to a current flowing through load resistor 106, and amplifier 108 applies a variable gain amplification to ensure a constant amplitude output which is fed to clock and data recovery unit 110. Output drivers 112 and 114 deliver recovered clock differential data to biasing resistors 120 and 122, as well as termination resistor 130 in deserializer 93, whose output is not shown for clarity. A typical integrated circuit combining a transmit serializer 91 and receive deserializer 93 is S3028 by Applied Micro Circuits Corporation (AMCC). Output drivers 116 and 118 deliver recovered data to biasing resistors 124 and 126, as well as termination resistor 128. There are several sources of EMI from these circuits. For the case of the transmitter, laser diode 94 is driven single ended by driver 92, which means that while the input signals 96+ and 96− are complimentary and symmetrical with respect to ground, the drive voltages in the leads 36a are neither symmetrical nor balanced with respect to ground. This transmitter diode is represented by device 86 of FIG. 4, and these unbalanced currents easily couple from the laser diode 86 to the housing 82 to the conductive crimp ferrule 80 of the cable termination 74, all of which are sequentially coupled to each other through proximal capacitance. For the case of the receiver, EMI generation is caused by imbalances in the symmetrical outputs of the clock applied across resistor 130. When receive signal is applied to photodiode 104, the miniscule unbalanced voltages in leads 36b are insufficient to generate measurable EMI. However, during clock recovery, large currents flow through leads 40 into termination resistor 130. Intrinsic imbalances in these currents excite the physical length 1 46 of FIG. 2 and cause the receiver receptacle housing 82 of FIG. 4 to carry a magnified version of this signal, particularly if the signal harmonic wavelength is near the physical quarter wavelength dimension l 46. In the case of oc-12 and oc-48 transceivers, where length l 46 is approximately 1.25 inches which has a quarter wavelength of 3 Ghz, harmonics in the 3 Ghz to 4 Ghz range will experience transmission gain. As before, crimp ferrule 80 affords emission via aperture 31b through chassis 30, and excessive EMI radiation on recovered clock harmonics from 3 Ghz to 4 Ghz will be found on oc-12 and oc-48 transceivers, particularly when cable 74 is installed allowing coupling to ferrule 80.

Examining the sources of these imbalances in FIG. 5, the PECL output transistors 112 and 114 may not remain linearly biased, and in this case the rising edge rate would be governed by the familiar transistor equation:

$$Zo = \frac{KT}{q(Ie)}$$

Where

Zo=output impedance

KT/q=0.026 V at room temperature T=25° C.

Ie is the instantaneous emitter current.

Examining the source of intrinsic imbalance, we can see that when Q112 is high and Q114 is low, more Ie is flowing in Q112, and less is flowing in Q114, so the output impedance of Q112 is lower than the output impedance of Q114, which implies that while the rising edge of Q112 or Q114 is coincident with the falling edge of complimentary Q114 or Q112 respectively, the rising edge provided by each transistor will always be faster than the falling edge of the complimentary transistor. If the bias current were insufficient to handle the delivery of current to load resistor 128, the output transistor would go into a non-linear state, and the output impedance of the stage would discontinuously become that of the bias resistor R120 or R122. The difference in edge rates would thereafter cause the production of asymmetric currents, and this would result in the further production of EMI. The data outputs typically produce less EMI than the clock outputs, since the clock is typically a 50% duty cycle decomposing into odd harmonics of the fundamental, while the data pattern has a more random distribution of edge transitions, and hence contains more broadly distributed spectral energy.

Figure 6:
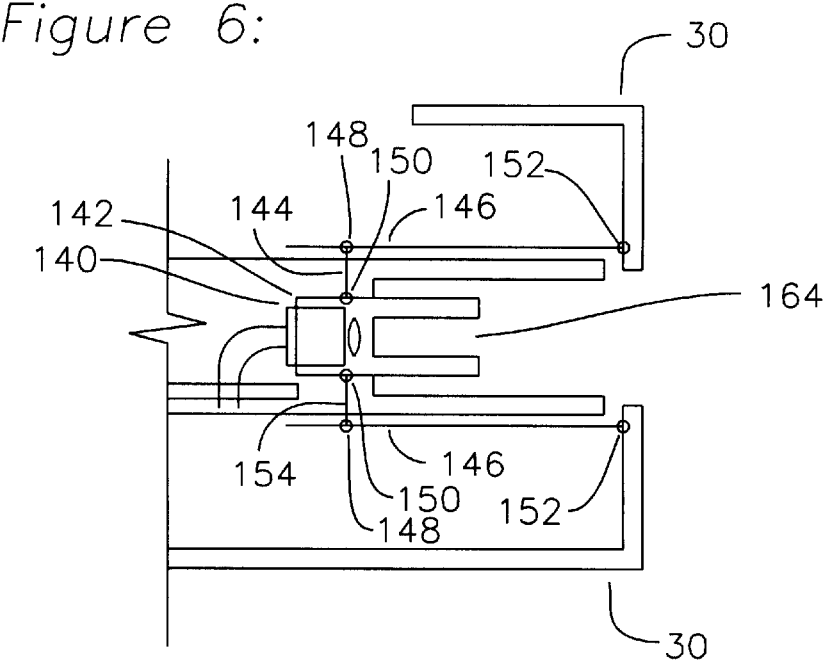
FIG. 6 is the side view of a transceiver with a detuning element.

FIG. 6 shows the present invention. Electrical to optical converter or optical to electrical converter 140 is placed in a metallic or conductive housing 142 which has ingress access 164 for an optical ferrule similar to 78 of FIG. 4. A first shield extension 144 and 154 connect the conductive housing 142 to a collar shield 146, which comprises a conductive sheet formed around the housing of the transceiver. The collar shield 146 is formed with spring fingers which makes contact to the chassis 30. The complete structure forms a reentrant detuning device comprising the front panel 30, collar shield 146, first shield extensions 144 and 154, and conductive housing 142, which also provides electrical continuity to O/E converter or E/O converter 140. In this manner, unbalanced voltages from the transmitter or receiver sections as described earlier are shunted to the front panel chassis 30, and the conductive housing 142 is held at a fixed potential, thereby minimizing radiation through housing 142. When a cable is installed, no resonant structures are present to conduct EMI outside the enclosure, even though conductive ferrule 80 is still present in the attached cable. The quarter wavelength structure formed by l 46 is now chassis referenced, resulting in the detuning of the antenna. The structure is now terminated at both ends, and while a new mode of excitation may occur based on the two ends constrained to ground and the midspan of l 46 having modal radiation, the end near ferrule 80 is now at chassis potential, so minimal radiation occurs. The collar shield may be formed in the housing through the use of a conductive plastic, or through the application of a conductive epoxy such as . Similarly, the extension shields which connect the converter housings to the collar shield may also be formed using sheet foil conductors, conductive plastics, or conductive housings. The conductive properties of the material in general must be assured in the radiation range of the optical signal, which generally spans a range from the fundamental frequency through the 7th harmonic. For oc-12, which operates at a fundamental rate of 622 Mhz, this implies a frequency range from 622 Mhz through 4.2 Ghz. In this frequency range, the RF impedance should be less than 2 ohms from ferrule to shield. For a conductive epoxy connection having a length of 0.1 cm and a cross sectional area of 0.1 cm by 0.1 cm, this translates to a bulk resistivity of 0.2 ohm-cm, and would be the same for shield material formed from a conductive epoxy enclosure. The inter-shield connections 148, 150, and 152 may be accomplished several different ways. Resilient fingers may be formed into the conductive extension or collar shields, or the inter-shield electrical connections may be formed through the application of a brazed, welded, or conductive adhesive.

Figure 7:
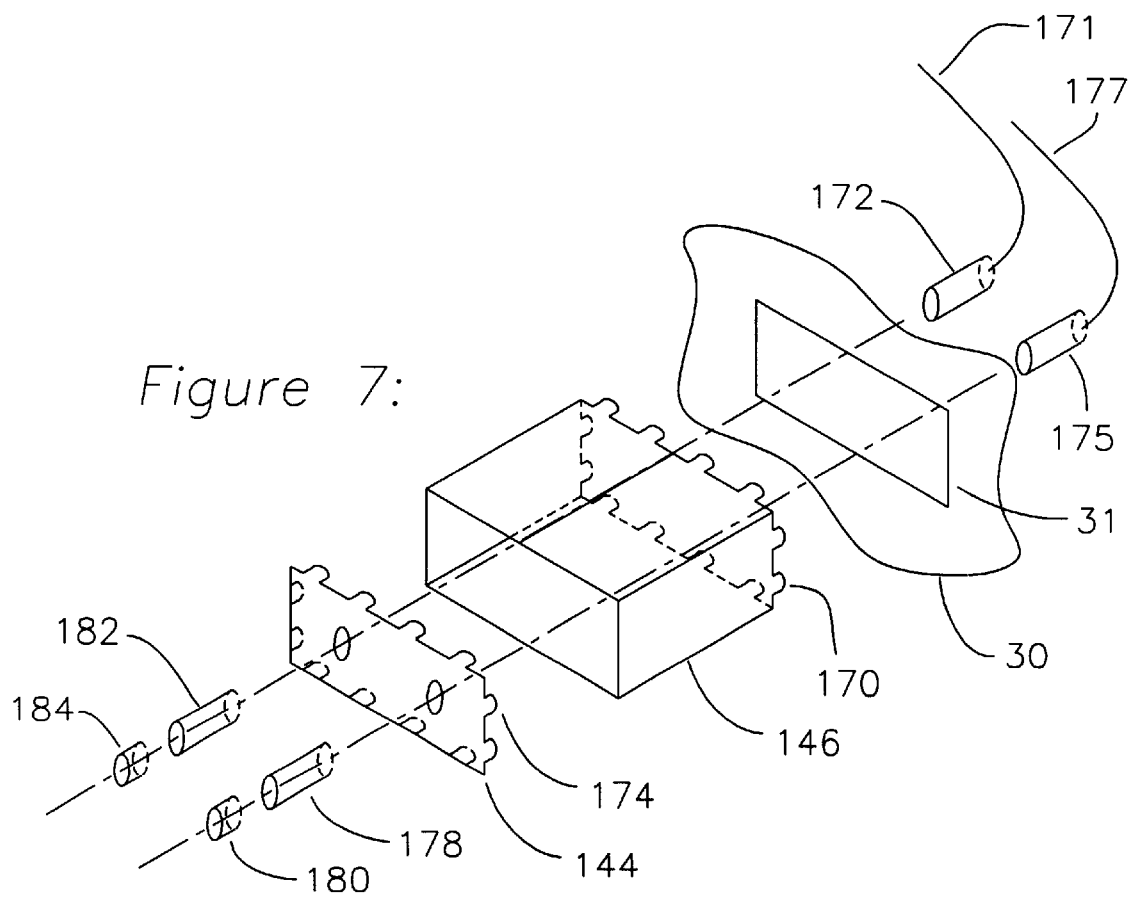
FIG. 7 is an isometric view of the detuning elements of FIG. 6.

FIG. 7 shows an isometric view of the detuning device of FIG. 6. Conductive enclosure 30 having aperture 31 has a conductive collar shield 146 making contact via a plurality of contact fingers 170, which form the electrical connection 152 as described earlier. The transmitter of FIG. 7 comprises electrical to optical converter 184, which makes electrical contact with a transmit ferrule 182, also referred to as a first transmit cylindrical housing 182. First transmit cylindrical housing 182 has provisions for coupling optical energy from electrical to optical converter 184 on one side and to a second transmit cylindrical housing 172 on the other side, which couples optical energy to an optical cable 171. First shield extension 144 is made from a conductive material, and has a plurality of fingers 174 for making contact to the inside of collar shield 146, shown as connection 148 of FIG. 6. First shield extension 144 makes contact with transmit ferrule 182, and with receive ferrule 178, which form the connection shown as 150 of FIG. 6. In a similar manner, the receive ferrule 178, also referred to as the first receive cylindrical housing 178 makes electrical contact with the receive optical to electrical converter 180 at connection 150, as well as first shield extension 144 at connection 148. The first receive cylindrical housing 178 aligns and receives an optical signal from mating second receive cylindrical ferrule 175, which couples optical signal from optical fiber 177. The elements chassis 30, collar shield 146 including fingers 170, first extension shield 144, first transmit cylindrical housing 182, first receive cylindrical housing 178, and the housings of transmit electrical to optical converter 184 and receive optical to electrical converter 180 are electrically conductive, and electrically coupled to each other according to the method shown in FIGS. 6 and 7.

FIG. 8 shows an alternate means of making the connections shown in FIG. 6. The enclosure 30, collar shield 146 with fingers 170, first transmit ferrule 182, transmit electrical to optical converter 184, first receive transmit ferrule 178, and receive optical to electrical converter 180 perform the same functions described earlier. Transceiver conductive baseplate 196 is electrically coupled to first transmit ferrule 182 and to first receive ferrule 178 with contact ferrule 194 and 192, respectively. Contact ferrules 194 and 192 may be formed from sheet metal, or they may be formed from a conductive epoxy, as long as they make a high frequency connection between baseplate 196 and first ferrules 182 and 178. The bottom of baseplate 196 makes electrical contact with collar shield 146 on the inside bottom surface of collar shield 146.

I claim:

1. An optical transceiver comprising:

a transmitter having an electrical to optical converter with an electrical input and an optical output, said optical output coupling transmit optical energy to a first cylindrical housing, said cylindrical housing having an aperture for receiving a mating optical ferrule which receives said transmit optical energy;

a receiver having an optical to electrical converter with an optical input and an electrical output, said optical input coupling receive optical energy from a second cylindrical housing having an aperture for receiving a mating optical ferrule containing said receive optical energy;

an enclosure containing said transmitter and said receiver;

a conductive collar shield surrounding said first cylindrical housing and said second cylindrical housing and said optical to electrical converter and said electrical to optical converter;

a first shield extension disposed between said first cylindrical housing and said collar shield, and a second shield extension disposed between said second cylindrical housing and said collar shield.

2. The transceiver of claim 1 where said conductive collar shield comprises a continuous foil band having a central axis parallel to the central axis of said cylindrical ferrule.

3. The transceiver of claim 2 where said conductive collar shield comprises said enclosure being made from a material having a bulk resistivity less than 0.2 ohm-cm for frequencies ranging from the fundamental frequency of the communication link through the 7th harmonic of said fundamental frequency.

4. The transceiver of claims 2 or 3 where said shield extension comprises a foil conductor at least as wide as said transmit or receive housing.

5. The transceiver of claim 2 or 3 where said shield extension comprises a conductive material having a bulk resistivity less than 0.2 ohm-cm for frequencies ranging from the fundamental frequency of the communication link through the 7th harmonic of said fundamental frequency.

6. The transceiver of claim 2 or 3 where said shield extension comprises a conductive epoxy having a bulk resistivity less than 0.2 ohm-cm for frequencies ranging from the fundamental frequency of the communication link through the 7th harmonic of said fundamental frequency.

7. An optical transmitter comprising:

a transmitter having an electrical to optical converter with an electrical input and an optical output, said optical output coupling transmit optical energy to a cylindrical housing, said cylindrical housing having an aperture for receiving a mating optical ferrule;

an enclosure containing said transmitter;

a conductive collar shield surrounding said cylindrical housing and said electrical to optical converter;

a shield extension disposed between said cylindrical housing and said collar shield.

8. The transmitter of claim 7 where said conductive collar shield comprises a continuous foil band having a central axis parallel to the central axis of said cylindrical ferrule.

9. The transmitter of claim 7 where said conductive collar shield comprises said enclosure being made from a material having a bulk resistivity less than 0.2 ohm-cm for frequencies ranging from the fundamental frequency of the communication link through the 7th harmonic of said fundamental frequency.

10. The transmitter of claims 8 or 9 where said shield extension comprises a foil conductor at least as wide as said transmit housing.

11. The transmitter of claim 8 or 9 where said shield extension comprises a conductive material having a bulk resistivity less than 0.2 ohm-cm for frequencies ranging from the fundamental frequency of the communication link through the 7th harmonic of said fundamental frequency.

12. The transmitter of claim 8 or 9 where said shield extension comprises a conductive epoxy having a bulk resistivity less than 0.2 ohm-cm for frequencies ranging from the fundamental frequency of the communication link through the 7th harmonic of said fundamental frequency.

13. An optical receiver comprising:

a receiver having an optical to electrical converter with an optical input and an electrical output, said optical input coupling optical energy from a cylindrical housing having an aperture for receiving a mating optical ferrule to said optical to electrical converter;

an enclosure containing said receiver;

a conductive collar shield surrounding said receiver cylindrical housing and said optical to electrical converter;

a shield extension disposed between said cylindrical housing and said collar shield.

14. The receiver of claim 13 where said conductive collar shield comprises a continuous foil band having a central axis parallel to the central axis of said cylindrical ferrule.

15. The receiver of claim 13 where said conductive collar shield comprises said enclosure being made from a material having a bulk resistivity less than 0.2 ohm-cm for frequencies ranging from the fundamental frequency of the communication link through the 7th harmonic of said fundamental frequency.

16. The receiver of claims 14 or 15 where said shield extension comprises a foil conductor at least as wide as said transmit or receive housing.

17. The receiver of claim 14 or 15 where said shield extension comprises a conductive material having a bulk resistivity less than 0.2 ohm-cm for frequencies ranging from the fundamental frequency of the communication link through the 7th harmonic of said fundamental frequency.

18. The receiver of claim 14 or 15 where said shield extension comprises a conductive epoxy having a bulk resistivity less than 0.2 ohm-cm for frequencies ranging from the fundamental frequency of the communication link through the 7th harmonic of said fundamental frequency.

* * * * *